United States Patent [19]
Cashen et al.

[11] Patent Number: 5,878,336
[45] Date of Patent: Mar. 2, 1999

[54] APPARATUS AND METHOD FOR DISCONTINUOUSLY OPERATING A RECEIVER

[75] Inventors: Dennis Joe Cashen, Lake Zurich; John Kramer, Elk Grove Village; Steven J. Olsen, Libertyville, all of Ill.

[73] Assignee: Motorola, Inc., Schaumburg, Ill.

[21] Appl. No.: 624,656

[22] Filed: Mar. 22, 1996

[51] Int. Cl.⁶ .................................................. H04B 1/16
[52] U.S. Cl. ...................... 455/343; 455/38.3; 455/574
[58] Field of Search ........................... 455/38.3, 343, 455/32.1, 38.1, 310, 574; 340/825.44, 825.47, 825.21; 370/313, 311; 375/376

[56] References Cited

U.S. PATENT DOCUMENTS

| | | | |
|---|---|---|---|
| 4,449,248 | 5/1984 | Leslie et al. | 455/38.3 |
| 4,631,496 | 12/1986 | Borras et al. | 455/343 |
| 5,140,698 | 8/1992 | Toko . | |
| 5,175,874 | 12/1992 | Auchter . | |
| 5,224,152 | 6/1993 | Harte . | |
| 5,241,568 | 8/1993 | Fernandez et al. | 375/116 |
| 5,252,963 | 10/1993 | Snowden et al. | 455/343 |
| 5,274,843 | 12/1993 | Murai et al. | 455/38.3 |
| 5,349,695 | 9/1994 | Zhong et al. | 455/343 |
| 5,381,133 | 1/1995 | Erhart et al. | 455/343 |
| 5,452,472 | 9/1995 | Tanaka | 455/38.2 |
| 5,471,655 | 11/1995 | Kivari | 455/343 |
| 5,475,877 | 12/1995 | Adachi | 455/343 |
| 5,487,090 | 1/1996 | Ide | 455/38.3 |
| 5,537,100 | 7/1996 | Hallberg | 455/38.3 |
| 5,551,078 | 8/1996 | Connell et al. | 455/343 |
| 5,613,235 | 3/1997 | Kivari et al. | 455/343 |
| 5,740,517 | 4/1998 | Aoshima | 455/38.3 |
| 5,740,529 | 4/1998 | Ide | 455/38.3 |
| 5,765,104 | 6/1998 | Kushita | 455/343 |

*Primary Examiner*—Andrew I. Faile
*Assistant Examiner*—Aung S. Moe
*Attorney, Agent, or Firm*—Mark D. Patrick

[57] ABSTRACT

An apparatus for discontinuously operating a receiver (302) includes a receive data circuitry (304) and processor circuitry (306). The apparatus and receiver (302) are incorporated in a communication device (104). The receiver (302) receives a communication signal (106) having a plurality of frames (200, 214, 224). Each of the frames has a synchronization field (202, 217, 222) followed by a data field (204, 218, 228). The receive data circuitry (304) synchronizes the communication device (104) with the communication signal (106) received by the receiver (302) according to an initial synchronization field (202). The receive data circuitry (304) decodes the following data field (204). The processor (306) evaluates the decoded data field. If the decoded data field indicates that the receiver (302) is locked, the processor (306) powers off the receiver (302) for the following synchronization fields (222).

19 Claims, 3 Drawing Sheets

APPARATUS AND METHOD FOR DISCONTINUOUSLY OPERATING A RECEIVER

FIELD OF THE INVENTION

This invention relates generally to a communication device and, more particularly, to an apparatus and method for controlling the operation of a receiver of the communication device.

BACKGROUND OF THE INVENTION

Many communication devices are powered by a battery. Those battery powered communication devices that minimize power consumption and conserve battery power have a commercial advantage as they help extend the operating time of the communication device. Accordingly, a significant amount of money and effort has been expended to reduce the amount of energy consumed by battery powered devices.

Radiotelephones are one type of battery powered communication device. Radiotelephones operate in a communication system by transmitting and receiving information via channels of the communication system during an active call state. The radiotelephone employs a receiver capable of tuning to any one of a number of different channels to receive information therefrom. The received information comprises synchronization fields and data fields. While waiting to place or receive a call, the radiotelephone monitors the received information in a standby mode. In the standby mode, the radiotelephone remains tuned to one of the channels, and receives and evaluates the synchronization fields and data fields to determine if it should enter an active call state.

It is known to periodically power off the receiver during the standby mode to conserve battery power. Schemes for periodically powering off the receiver are sometimes referred to as "discontinuous receive" schemes. One known discontinuous receive scheme powers off the receiver during portions of data fields that are predicted to be repetitive. Another known scheme powers off the receiver during data fields that are predicted to contain data intended for another receiver. However, such discontinuous receive schemes cannot be employed in communication systems that require reception and evaluation of each data field in its entirety.

Therefore, what is needed is an apparatus and method for discontinuously operating a receiver in a communication system that requires reception and evaluation of data fields in their entirety.

DETAILED DESCRIPTION OF THE PREFERRED EMBODIMENTS

An apparatus for discontinuously operating a receiver includes receive data circuitry and processor circuitry. The apparatus and receiver are incorporated in a communication device. The receiver receives a communication signal having a plurality of frames. Each of the frames has a synchronization field followed by a data field. The synchronization circuit synchronizes the communication device with the communication signal received by the receiver according to an initial synchronization field. The decoder decodes the following data field. The processor evaluates the decoded data field. If the decoded data field indicates that the receiver is locked in synchronization with the communication signal, the processor powers off the receiver for the following synchronization fields.

Figure 1:
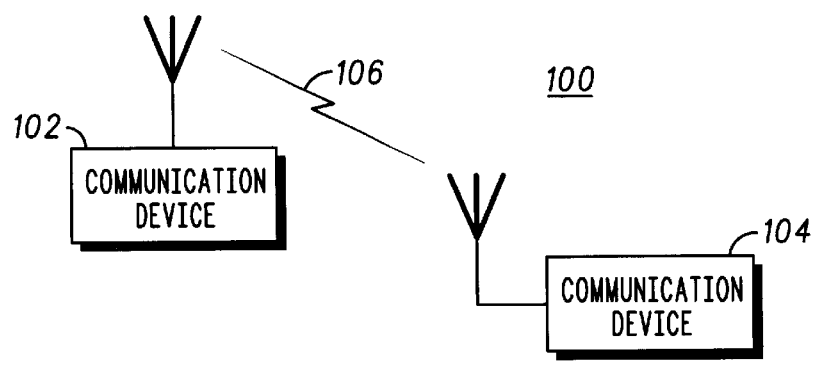
FIG. 1 is a block diagram illustrating a communication system employing first and second communication devices.

FIG. 1 illustrates communication system 100. Communication system 100 includes communication devices 102 and 104 that communicate over communication link 106. Communication devices 102 and 104 can be two-way radios, cellular radiotelephones, cordless radio telephones, radios, base stations, radio transmitters, personal digital assistants, modems, land line telephones, or the like. The communication link 106 can be a wireless connection, a wireline connection such as a twisted wire pair, a coaxial cable, or the like. In the illustrated embodiment, communication system 100 is a cellular radiotelephone system, such as an AMPS (Advanced Mobil Phone Service) system, a NAMPS (Narrow-band Advanced Mobil Phone Service) system, a JTACS (Japan Total Access Communication Service) system, a NTACS (Narrow-band Total Access Communication Service) system, an ETACS (Extended Total Access Communication Service) system, a NMT (Nordic Mobile Telephone) system, or the like. The illustrated communication device 102 is a cellular base station and the illustrated communication device 104 is a cellular radiotelephone compatible with communication device 102. In the illustrated embodiment, communication link 106 comprises an RF (radio frequency) communication signal consisting of a continuous bit stream sent by communication device 102 and received by communication device 104 on any one of a plurality of channels.

Figure 2:
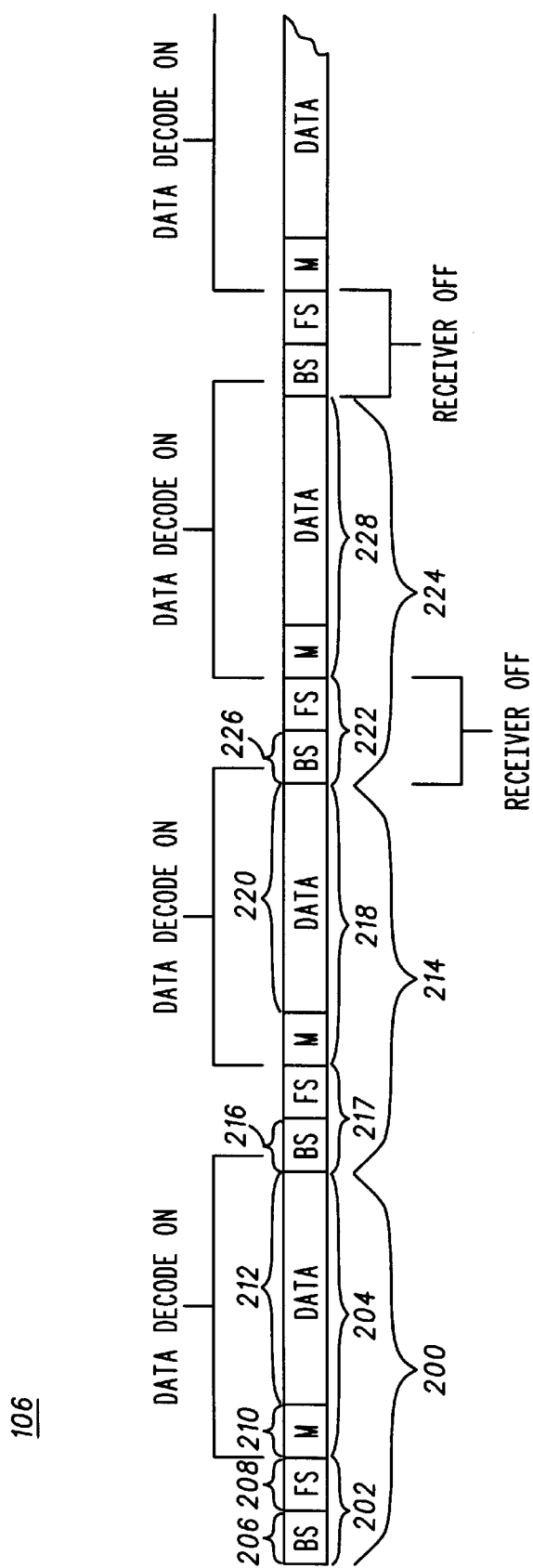
FIG. 2 is a diagram illustrating a signaling format for communicating information from the first communication device of FIG. 1 to the second communication device of FIG. 1.

A signaling format for information in communication link 106 is illustrated in FIG. 2. The information is a continuous bit stream comprising a plurality of frames, such as frame 200. Each frame comprises a synchronization field, such as synchronization field 202, followed by a data field, such as data field 204. In the illustrated embodiment, synchronization field 202 further comprises a bit synchronization subfield, such as bit synchronization subfield 206, followed by a frame synchronization subfield, such as frame synchronization subfield 208. The bit synchronization subfield consists of a predetermined 15 bit alternating pattern (101010101010101). The frame synchronization subfield consists of a predetermined 11 bit pattern (11100010010). Also in the illustrated embodiment, the data field further comprises a mute subfield, such as mute subfield 210, followed by a data subfield, such as data subfield 212. The mute subfield consists of a 12 bit pattern of alternating parity bits and zeros. The data subfield consists of a 128 bit pattern of alternating parity bits and data bits. As such, each frame consists of 166 bits. Those skilled in the art will recognize that this specific example of a signaling format is employed in the NMT system, although the invention may be advantageously employed in other systems having other signaling formats.

Figure 3:
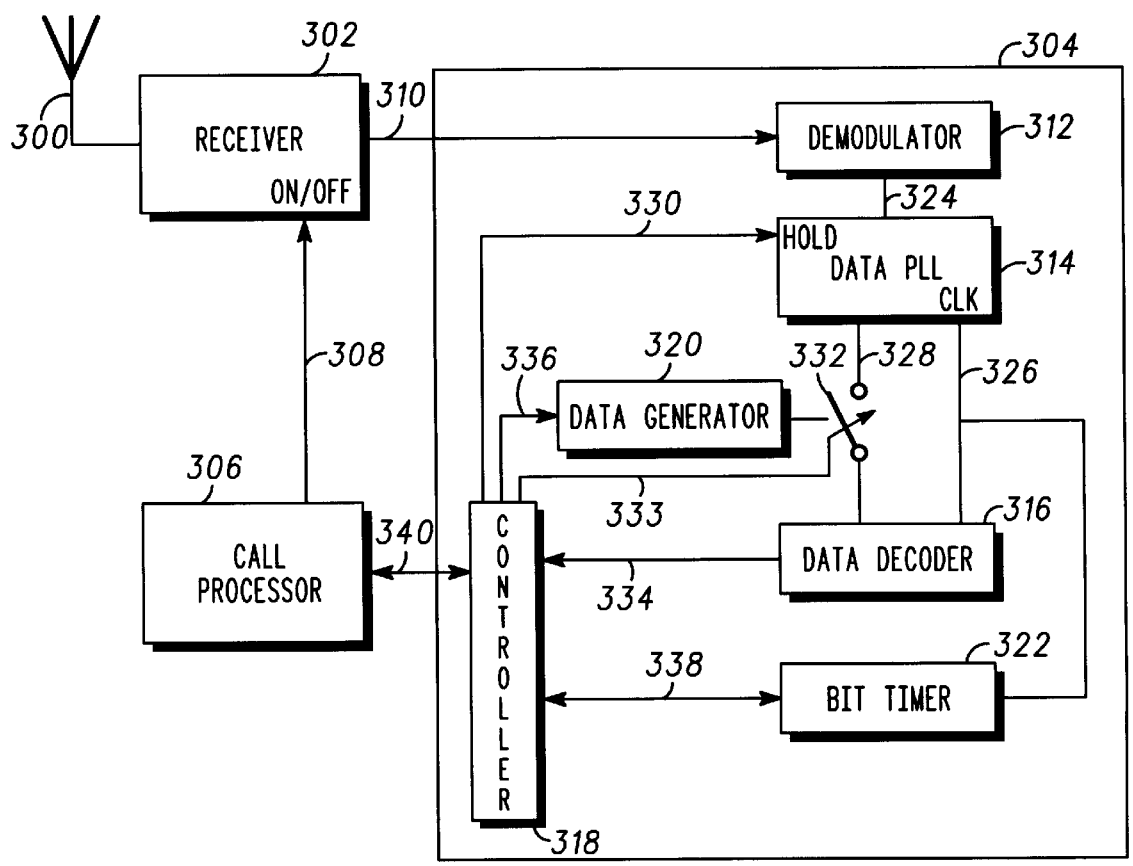
FIG. 3 is a block diagram illustrating apparatus comprising a receive path of the first or second communication device of FIG. 1.

Communication device 104 employs apparatus shown in FIG. 3 to receive the continuous bit stream sent by communication device 102 via communication link 106. Communication device 104 includes antenna 300, receiver 302, receive data circuitry 304, and call processor 306. Antenna 300 couples the continuous bit stream to receiver 302. Receiver 302, which can, for example, be a super heterodyne receiver, is tunable to receive the continuous bit stream on any one of the plurality of channels. Receiver 302 has a discontinuous mode of operation, that is, receiver 302 is permitted to be powered on by an "ON" signal or powered off by an "OFF" signal. The ON/OFF signal is input to receiver 302 via an ON/OFF port coupled to line 308. Receiver 302 outputs the received continuous bit stream on line 310 coupled to receive data circuitry 304.

Receive data circuitry 304 includes demodulator 312, data PLL (phase lock loop) 314, data decoder 316, controller 318, data generator 320, bit timer 322. Demodulator 312 is coupled to receiver 302 via line 310 to receive the continuous bit stream. Demodulator 312 is implemented using any suitable means, such as a conventional demodulator employing a known demodulation technique, such as MSK (Minimum Shift Keying) demodulation. Demodulator 312 serially outputs a demodulated continuous bit stream on line 324.

Data PLL 314 is coupled to demodulator 312 via line 324. Data PLL 314 receives the demodulated continuous bit stream output by demodulator 312 and detects the demodulated synchronization field thereof. Data PLL 314, responsive to detection, becomes synchronized to the synchronization field. Data PLL 314 outputs a clock signal on line 326 via a CLK port at a rate corresponding to the bit rate of the synchronization field of the continuous bit stream. Each pulse of the clock signal corresponds to one bit of time in the continuous bit stream. Data PLL 314 outputs the continuous bit stream on line 328. Data PLL 314 is permitted to be placed in a hold mode responsive to a hold signal coupled to a HOLD port of data PLL 314 via line 330. When in the hold mode, data PLL 314 no longer responds to the continuous bit stream on line 324 and maintains the clock signal on line 326 at a constant phase. Data PLL 314 may be implemented using any suitable commercially available phase lock loop.

Data decoder 316 is directly connected to line 326 and switchably connected to line 328 via switch 332. Data decoder 316 operates in synchronization with the clock signal on line 326. Switch 332 is normally closed to connect line 328 to data decoder 316. Data decoder 316 receives the continuous bit stream when switch 332 is connected to line 328. When switch 332 is closed, data decoder 316 monitors the synchronization field and decodes the data field according to the alternating parity bits contained in the data field and the synchronization field of the next frame following the data field. Data decoder 316 stores the data field as it is decoded. Once decoding of the field is complete, the decoded data field is output on line 334.

Controller 318 is coupled to receive the decoded data field on line 334. Controller 318 can be implemented using any suitable commercially available microcontroller or microprocessor, such as a 68HC11 microprocessor manufactured and sold by Motorola, Inc. Controller 318 generates the hold signal on line 330, a switch control signal on line 333, a data generation signal on line 336, and a timer set signal on line 338. These signals are generated responsive to the decoded data field received via line 334 and call process control signals received via line 340. Controller 318 outputs the decoded data field to call processor 306 on line 340.

Data generator 320 is switchably coupled to data decoder 316 via switch 332. Data generator 320 outputs a predetermined number of either logic low or logic high signals. Data generator 320 may be implemented using an asynchronous shift register. When the data generation signal is output from controller 318 on line 336 to activate data generator 320, switch 332 is controlled via the switch control signal output by controller 318 on line 333 to connect data generator 320 to data decoder 316. Data generator 320 outputs the predetermined number of all high or all low logic bits which are input into data decoder 316.

Bit timer 322 is coupled to line 326. Bit timer 322 is loaded with a predetermined timer value via a timer load signal on line 338. The predetermined timer value corresponds to a predetermined number of bits. Once loaded, bit timer 322 is initiated and decrements for each bit of the continuous bit stream by decrementing for each pulse of the clock signal received via line 326. After decrementing for the predetermined number of bits, bit timer 322 expires and outputs a timer expiration signal via line 338.

Call processor 306 is coupled to receive the decoded data from controller 318 on line 340. Call processor 306 can be implemented using any suitable commercially available microcontroller or microprocessor, such as a 68HC11 microprocessor manufactured and sold by Motorola, Inc. Call processor 306 evaluates the decoded data field. Responsive to this evaluation, call processor 306 selectively outputs the ON/OFF signal to receiver 302. Although shown as separate blocks, one skilled in the art will recognize that call processor 306 and controller 318 could alternatively be illustrated as a single controller and implemented using a single microprocessor such as the aforementioned 68HC11 microprocessor.

Figure 4:
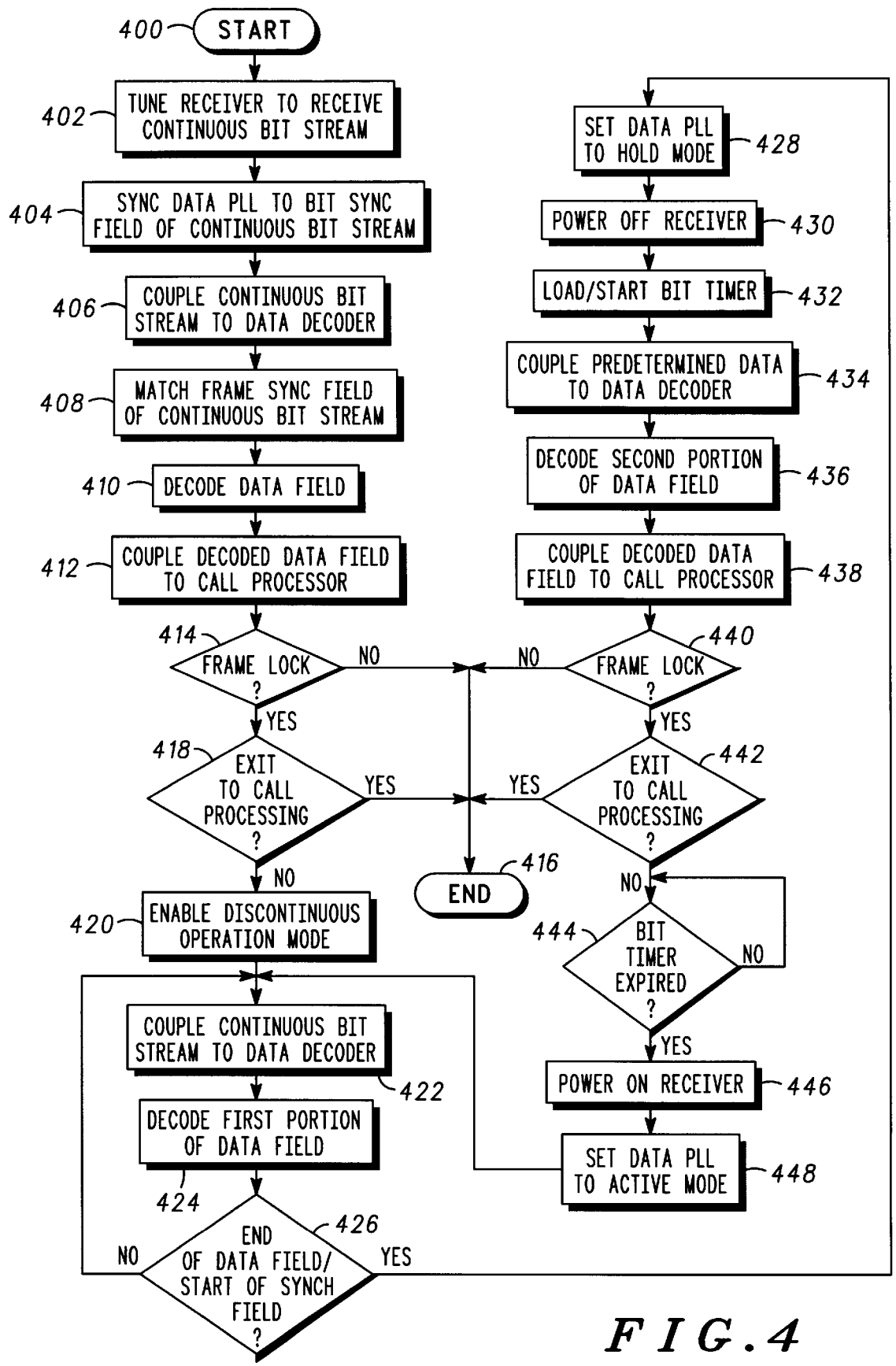
FIG. 4 is a flowchart illustrating a method of discontinuously operating a receiver of the first or second communication device of FIG. 1.

A method of discontinuous operation of receiver 302 during the standby mode implemented by the apparatus of FIG. 3 is illustrated in FIG. 4. FIG. 4 will be described in conjunction with FIGS. 2 and 3. The subroutine is initiated at block 400. The subroutine is performed each time communication device 104 tunes to a channel during the standby mode. Call processor 306 generates the ON signal on line 308 to power on receiver 302 to initiate a scanning mode. During the scanning mode, receiver 302 will scan the channels to look for a valid data channel. The method of FIG. 4 is performed once the valid data channel is found.

At block 402, receiver 302 is tuned to receive the continuous bit stream of communication link 106 on a first channel. As the continuous bit stream is received, it is coupled to demodulator 312 via line 310 for demodulation. The demodulated data is coupled to data PLL via line 324.

At block 404, data PLL 314 detects the alternating bit pattern of bit synchronization subfield 206 in frame 200 of the continuous bit stream. Data PLL 314 synchronizes to bit synchronization subfield 206 and generates the clock signal on line 326. Data PLL 314 serially couples the continuous bit stream to data decoder 316 at block 406.

At block 408, data decoder 316 monitors frame synchronization subfield 208 of synchronization field 202. Data decoder 316 compares, in a bitwise fashion, frame synchronization subfield 208 to a predetermined bit sequence stored in data decoder 316. Frame synchronization occurs in frame 200 when synchronization subfield 208 matches the predetermined bit sequence.

At block 410, data field 204 and, particularly, data subfield 212 is decoded by data decoder 316. In the illustrated embodiment, data subfield 212 consists of a 128 bit pattern of alternating parity bits and data bits. Some of the data bits of data subfield 212 are decoded using bits in mute subfield 210 and bits in the following frame, indicated in FIG. 2 as frame 214. In particular, the last three data bits of data subfield 212 are decoded using the first three zeroes of bit synchronization subfield 216 of frame 214. As such, data decoding occurs during synchronization field 217 as indicated by "Data Decode On" for frame 200 in FIG. 2. During data decoding, decoded data bits of data subfield 212 are stored in data decoder 316. Once decoding of data field 204 is complete, the decoded data bits of data subfield 212 are coupled to call processor 306 via controller 318 and lines 334 and 340 at block 412.

At blocks 414 and 416, call processor 306 evaluates the decoded data bits of data subfield 212 of data field 204. At block 414, call processor 306 determines if the decoded data word indicates that receiver 302 is locked onto the continuous bit stream, i.e., has frame lock. If, for example, the decoded data word is unreadable, frame lock has not occurred and the method proceeds to block 416 where it is ended. If the decoded data word is valid and indicates, for example, an idle frame, frame lock is deemed to exist and the method proceeds to block 418. Once frame lock is established, subsequent synchronization fields are not demodulated by demodulator 312 or monitored by data PLL 314. There are sufficient transitions in subsequent data fields to maintain synchronization of the clock signal with the continuous bit stream.

At block 418, call processor 306 determines if the decoded data bits indicate that an exit to call processing is required. If, for example, the decoded data bits comprise a page message directing receiver 302 to tune to another channel, the method proceeds to block 416 where it is ended. If, for example, the decoded data bits comprise data meant for another receiver, an exit is not required at block 418 and call processor 306 signals controller 318 to enable discontinuous operation of receiver 302 during subsequent synchronization fields at block 420.

At block 422, data PLL 314 serially couples data field 218 of frame 214 to data decoder 316. At block 424, data decoder 316 decodes a predetermined portion of data field 218. In the illustrated embodiment, at block 424 data decoder 316 decodes and stores up to the end of data field 218. That is, data decoder 316 decodes all but the last three data bits of data subfield 220. As stated, the last three data bits of data subfield 212 are decoded using the first three zeroes of the following synchronization field. Coupling of data field 218 to data decoder 316 continues until the end of data field 218 of frame 214 or the beginning of frame 224 in FIG. 2 is reached at block 426.

At block 428 and at the end of data field 218 and the beginning of synchronization field 222 of frame 224 of FIG. 2, controller 318 places data PLL 314 in the hold mode by generating the hold signal on line 330. At block 430, call processor 306 turns off receiver 302 by generating the off signal on line 308. By powering down receiver 302 during the synchronization fields, overall power consumption during standby is substantially reduced without losing any data in the data fields. At block 432, controller 318 loads bit timer 322 with the predetermined timer value and starts bit timer 322. The predetermined value designates the amount of time that receiver 302 will remain powered off. In the illustrated embodiment, the predetermined timer value corresponds to the duration of the synchronization field of continuous bit stream of communication link 106, which can, for example, correspond to 26 bits, less 2 bits for proper stabilization after powering receiver 302 back on. As such, the predetermined timer value corresponds to 24 bits.

At block 434 and during synchronization field 222, controller 318 generates the data generation signal on line 336 and controls switch 332 to connect data generator 320 to data decoder 316. Data generator 320 couples the predetermined number of logical bits into data decoder 316. In the illustrated embodiment, the predetermined number of logical bits is three logical low signals or, more particularly, three logical zeros. Data decoder 316 uses the three logical zeros to decode the remaining portion of data field 218 at block 436. By coupling the requisite number of zeros into data decoder 316 in this manner, data field 218 can be completely decoded without receiving bit synchronization subfield 226 or synchronization field 222 of FIG. 2.

Once data field 218 is completely decoded, it is coupled to call processor 306 at block 438. At block 440, call processor 306 evaluates data field 218 for frame lock in a manner similar to that used to evaluate data field 204 in block 414. If frame lock does not exist, the method proceeds to block 416 where it is ended. If frame lock does exist, the method proceeds to block 442. At block 442, call processor 306 evaluates data field 218 for call processing in the same manner that it evaluated data field 204 in block 418. If an exit to call processing is required, the method proceeds to block 416 where it is ended. If an exit is not required at block 442, the method proceeds to block 444.

Controller 318 waits at block 444 for the timer expiration signal generated by bit timer 322 on line 338. In the illustrated embodiment, bit timer 322 will generate the timer expiration signal after 24 bits of time have elapsed from timer load/start at block 432. Upon reception of the timer expiration signal, controller 318 signals call processor 306 via line 340. At block 446, call processor 306 generates the on signal on line 308, which in turn causes receiver 302 to power on. At block 448, controller 318 terminates the hold signal on line 330 and returns data PLL 314 to an active mode of operation. The method then returns to block 422 where data PLL 314 couples subsequent data fields, such as data field 228 of frame 224 to data decoder 316.

As described above, once discontinuous operation of receiver 302 has been enabled (beginning at block 420), receiver 302 is powered off for the duration of the synchronization field (the bit synchronization subfield and the frame synchronization subfield) less a stabilization period after powering receiver 302 back on. Such is indicated by "Receiver Off" in FIG. 2. In the illustrated embodiment, receiver 302 is powered off for approximately 14.5% of the time as determined by the following equation, wherein each bit has an equal corresponding time of 1/(bit rate):

$$\frac{\text{Bit Sync Length} + \text{Frame Sync Length} - \text{Turn-on Time}}{\text{Frame Length}} =$$

$$\frac{15 \text{ bits} + 11 \text{ bits} - 2 \text{ bits}}{166 \text{ bits}} = 0.145 = 14.5\%.$$

The aforementioned method is particularly advantageous for use by communication devices that operate in communication systems employing a communication link that has comparatively large synchronization fields, such as the NMT system.

Thus, it can be seen that substantial power savings in a communication device can be realized by employing discontinuous operation of a receiver during synchronization fields. The disclosed method does not interfere with the decoding of any data fields. It is particularly advantageous in systems that require decoding of the entire data field of each frame and, thus, can not employ prior art methods that discontinuously operate the receiver during reception of the data field. It will be recognized that the aforementioned method and apparatus could alternatively be used in conjunction with these prior art methods to realize even greater power savings for these systems wherein decoding of the data field is not detrimentally affected by the disabling of the receiver during the data field.

What is claimed is:

1. A method for discontinuously operating a receiver of a communication device, the receiver for receiving a data stream, the data stream defined by a plurality of frames, each of the plurality of frames having a synchronization field followed by a data field, the method comprising the steps of:

tuning the receiver to receive the data stream;

synchronizing the communication device to the synchronization field of a first one of the plurality of frames of the data stream;

powering off, once synchronized, the receiver for substantially all of the synchronization field of at least one subsequent one of the plurality of frames of the data stream and, thereby, interrupting receipt of the data stream;

generating, in the communication device, predetermined data representative of at least a portion of the data stream; and providing, while the receiver is powered off and the data stream is interrupted, the predetermined data as a substitute for the data stream.

2. A method according to claim 1 further comprising the step of:

decoding, while the receiver is powered off, a portion of the data field of the at least one subsequent one of the plurality of frames using the predetermined data.

3. A method according to claim 2 wherein the step of generating further comprises the substep of:

generating, in the communication device, the predetermined data to be representative of at least a portion of the synchronization field of the at least one subsequent one of the plurality of frames.

4. A method according to claim 2 wherein the data stream comprises a continuous stream of bits, and the step of generating further comprises the substep of:

generating, in the communication device, the predetermined data to be representative of a predetermined number of bits of the synchronization field of the at least one subsequent one of the plurality of frames.

5. A method according to claim 1 further comprising the step of:

decoding, prior to powering off the receiver, the data field of the first one of the plurality of frames using the synchronization field of a second one of the plurality of frames, the second one of the plurality of frames following the first one of the plurality of frames and not one of the at least one subsequent one of the plurality of frames.

6. A method according to claim 5 further comprising the steps of:

evaluating, following decoding of the data field of the first one of the plurality of frames, the data field of the first one of the plurality of frames; and enabling, responsive to evaluating, powering off of the receiver when the data field of the first one of the plurality of frames indicates that the communication device is locked to the data stream.

7. A method according to claim 5 wherein the step of generating further comprises the substep of:

generating, in the communication device, the predetermined data to be representative of at least a portion of the synchronization field of the at least one subsequent one of the plurality of frames; and further comprising the step of:

decoding the data field of the second one of the plurality of frames using the predetermined data.

8. A method according to claim 7 further comprising the steps of:

decoding, prior to powering off the receiver, a first portion of the data field of the second one of the plurality of frames; and decoding, after powering off of the receiver, a second portion of the data field of the second one of the plurality of frames using the predetermined data, the second portion different from the first portion.

9. A method according to claim 8 further comprising the steps of:

holding the data stream at a start of the synchronization field of the at least one subsequent one of the plurality of frames;

loading and starting a timer at the start of the synchronization field of the at least one subsequent one of the plurality of frames with a predetermined duration substantially corresponding to a duration of the synchronization field of the at least one subsequent one of the plurality of frames; and removing holding, upon expiration of the timer, of the data stream prior to a start of the data field of the at least one subsequent one of the plurality of frames.

10. A method according to claim 8 wherein the step of powering off the receiver further comprises the substep of powering off the receiver at a start of the synchronization field of the at least one subsequent one of the plurality of frames; and further comprising the steps of:

loading and starting a timer at the start of the synchronization field of the at least one of the subsequent ones of the plurality of frames with a predetermined duration substantially corresponding to a duration of the synchronization field of the at least one subsequent one of the plurality of frames; and powering on, upon expiration of the timer, the receiver.

11. A method for discontinuously operating a receiver of a communication device, the receiver for receiving a bit data stream, the bit data stream defined by a plurality of frames, each of the plurality of frames having a synchronization field followed by a data field, the method comprising the steps of:

tuning the receiver to receive the bit data stream;

synchronizing a data phase-locked loop (PLL) of the communication device to the synchronization field of a first one of the plurality of frames of the bit data stream;

generating a clock signal having a rate corresponding to the bit data stream;

coupling the bit data stream to a decoder of the communication device;

decoding at the decoder the data field of the first one of the plurality of frames;

evaluating the data field of the first one of the plurality of frames and determining that the receiver is locked to the bit data stream;

decoding at the decoder a first portion of the data field of a second one of the plurality of frames;

placing the data PLL in a hold mode to interrupt coupling of the bit data stream to the decoder;

powering off the receiver;

loading a timer with a predetermined duration substantially corresponding to a duration of the synchronization field of the plurality of frames;

starting the timer;

generating, in the communication device, predetermined data representative of a predetermined number of bits of the synchronization field of the plurality of frames of the bit data stream;

coupling, during interruption of the bit data stream, the predetermined data to the decoder;

decoding at the decoder a second portion of the data field of the second one of the plurality of frames using the predetermined data;

determining expiration of the timer;

powering on, upon expiration of the timer, the receiver; and placing, upon expiration of the timer, the data PLL in an active mode to again allow coupling of the bit data stream to the decoder.

12. An apparatus for discontinuously operating a receiver of a communication device, the receiver for receiving a data stream, the data stream defined by a plurality of frames, each of the plurality of frames having a synchronization field followed by a data field, the apparatus comprising:

receive data circuitry coupled to the receiver, the receive data circuitry comprising circuitry to synchronize the communication device to the synchronization field of a first one of the plurality of frames of the data stream and supply the received data stream, circuitry to generate predetermined data representative of at least a portion of the data stream and circuitry to decode the data field of the plurality of frames upon receipt of the data stream; and processor circuitry coupled to the receiver and the receive data circuitry to evaluate decoded data of the data field of the plurality of frames of the data stream, the processor circuitry, responsive to determining that the decoded data indicates that the receiver is locked, (1) powering off the receiver during at least one subsequent one of the synchronization field of the plurality of frames, (2) interrupting supply of the data stream to the circuitry to decode and (3) coupling the predetermined data to the circuitry to decode as a substitute for the interrupted data stream to prevent interruption of decoding of the data field of the plurality of frames.

13. An apparatus according to claim 12 wherein the circuitry to synchronize and supply of the receive data circuitry comprises a data phase lock loop (PLL), the data PLL to monitor the data stream and output a clock signal having a rate corresponding to the rate of the data stream, the data PLL to output the data stream to the circuitry to decode, and the data PLL further comprises a hold mode, the data PLL, in the hold mode, continuing output of the clock signal and interrupting output of the data stream.

14. An apparatus according to claim 13 wherein the circuitry to synchronize and supply of the receive data circuitry further comprises a timer coupled to the data PLL to receive the clock signal, the timer being programmable to a predetermined value, the predetermined value approximately corresponding to a duration of the synchronization field, the timer, thereafter, decrementing responsive to the clock signal.

15. An apparatus according to claim 13 wherein the circuitry to decode of the receive data circuitry comprises a data decoder, the data decoder switchably coupled to the data PLL to receive the data stream and coupled to the data PLL to receive the clock signal.

16. An apparatus for discontinuously operating a receiver of a communication device, the receiver for receiving a communication signal, the communication signal having a plurality of frames, each of the plurality of frames having a synchronization field followed by a data field, the apparatus comprising:

receive data circuitry coupled to the receiver to synchronize the communication device according to the synchronization field of a first one of the plurality of frames, the receive data circuitry comprising;

a decoder switchably coupled to receive and decode the data field of the plurality of frames, and a data generator switchably coupled to the decoder, the data generator being operable to shift predetermined data into the decoder to permit decoding of the data field of the plurality of frames while the receiver is powered off; and processor circuitry coupled to the receiver and the receive data circuitry to evaluate decoded data of the data field of the plurality of frames, the processor circuitry, responsive to determining that the decoded data indicates that the receiver is locked, powering off the receiver during subsequent ones of the synchronization field of the plurality of frames.

17. A radiotelephone comprising:

a receiver to receive a communication signal, the receiver having a discontinuous mode of operation, the communication signal having a plurality of frames, each of the plurality of frames having a synchronization field followed by a data field;

a demodulator coupled to the receiver to demodulate the communication signal;

a data phase lock loop (PLL) coupled to the demodulator, the data PLL to monitor the synchronization field of the communication signal and output a clock signal synchronized therewith, the data PLL to output the communication signal, the data PLL having a hold mode that maintains the clock signal;

a decoder switchably coupled to the data PLL to decode the data field of each of the plurality of frames and output a decoded data field therefore;

a data generator switchably coupled to the decoder and being controllable to shift a predetermined number of predetermined data into the decoder to permit decoding of a portion of the data field;

a timer coupled to the data PLL, the timer being programmable to a predetermined timer value, the timer, thereafter, decrementing responsive to the clock signal until expiration thereof; and a processor coupled to the receiver, the data PLL, the data data generator, and the timer, the processor evaluating the decoded data field, the processor, responsive to determining that the decoded data field indicates that the receiver is locked, placing the data PLL in the hold mode, powering off the receiver, coupling the predetermined timer value to the timer, the predetermined timer value corresponding to a duration of the synchronization field, controlling the data generator to shift the predetermined number of predetermined data into the decoder, powering on the receiver after the expiration of the timer, and removing the data PLL from the hold mode.

18. A method for discontinuously operating a receiver of a communication device, the receiver for receiving a data stream, the data stream defined by a plurality of frames, each of the plurality of frames having a synchronization field followed by a data field, the method comprising the steps of:

tuning the receiver to receive the data stream;

synchronizing the communication device to the synchronization field of a first one of the plurality of frames;

powering off the receiver for the synchronization field of subsequent ones of the plurality of frames;

generating, in the communication device, predetermined data representative of at least a portion of the synchronization field of the plurality of frames of the data stream; and decoding, while the receiver is powered off and receipt of the data stream is interrupted, at least a portion of the data field of one of the plurality of frames using the predetermined data.

19. An apparatus for discontinuously operating a receiver of a communication device, the receiver for receiving a data stream, the data stream defined by a plurality of frames, each of the plurality of frames having a synchronization field followed by a data field, the apparatus comprising:

a data phase lock loop (PLL) to synchronize the communication device to the synchronization field of a first one of the plurality of frames and to output the received data stream;

a data generator to generate predetermined data representative of at least a portion of the synchronization field of the plurality of frames;

a decoder to receive the data stream from the data PLL and decode the data field of the plurality of frames; and processor circuitry coupled to the receiver, the data PLL, the data generator, and the decoder, the processor circuitry, responsive to synchronization of the communication device, powering off the receiver during the synchronization field of subsequent ones of the plurality of frames and connecting the data generator to the decoder to permit decoding of the data field of the plurality of frames using the predetermined data when the receiver is powered off and the data stream is not being received by the decoder.

* * * * *